United States Patent
de Jong et al.

[11] Patent Number: 5,500,476
[45] Date of Patent: Mar. 19, 1996

[54] THERMOPLASTIC MIXTURE COMPRISING AN AGENT TO IMPROVE THE LACQUER BONDING

[75] Inventors: Robertus E. de Jong; Jacobus J. C. van der Kort, both of Bergen op Zoom, Netherlands

[73] Assignee: General Electric Company, Pittsfield, Mass.

[21] Appl. No.: 342,200

[22] Filed: Nov. 18, 1994

Related U.S. Application Data

[63] Continuation of Ser. No. 975,151, Nov. 12, 1992, Pat. No. 5,382,454, which is a continuation of Ser. No. 682,769, Apr. 9, 1990, abandoned.

[30] Foreign Application Priority Data

Apr. 10, 1990 [NL] Netherlands .............................. 9000838

[51] Int. Cl.⁶ .............................. C08K 5/06; C08L 51/04; C08L 53/00; C08L 67/02
[52] U.S. Cl. .......................... 524/377; 524/378; 524/504; 524/505; 525/64; 525/92 A; 525/94; 525/166
[58] Field of Search .................................... 524/377, 378, 524/502, 504, 505; 525/64, 92, 94, 166, 408

[56] References Cited

U.S. PATENT DOCUMENTS

| 4,927,675 | 5/1990 | Adams et al. | 428/483 |
| 5,348,999 | 9/1994 | de Jong et al. | 525/408 |

FOREIGN PATENT DOCUMENTS

| 0065748 | 4/1982 | Japan | 525/64 |

*Primary Examiner*—Peter A. Szekely

[57] ABSTRACT

A polymer mixture on the basis of a polyalkylene phthalate ester, a copolyether ester and an agent to improve the impact to which an agent to improve the bonding of lacquer systems on an aqueous base has been added. The polymer mixture according to the invention comprises a polyalkylene glycol polymer or a polyalkylene glycol copolymer as an agent to improve the lacquer bonding.

5 Claims, No Drawings

THERMOPLASTIC MIXTURE COMPRISING AN AGENT TO IMPROVE THE LACQUER BONDING

This is a divisional of application Ser. No. 07/975,151 filed on Nov. 12, 1992 U.S. Pat. No. 5,382,454 which is a continuation of Ser. No. 07/682,769 filed Apr. 9, 1990 now abandoned.

The invention relates to a polymer mixture comprising A) a polyalkylene phtalate ester, B) a copolyether ester, C) an agent to improve the impact strength and D) an agent to improve the bonding of aqueous lacquer systems upon the surface of articles moulded out of the polymer mixture.

Polymer mixtures are now being used on a large scale to manufacture therefrom parts by means of various treatments, for example, injection moulding and extrusion.

It is sometimes desired to provide the formed parts with a decorative and/or protective layer of lacquer. In this connection the bonding of the lacquer layer to the formed articles constitutes a problem.

Of late, an increasing number of lacquer systems on a aqueous basis are used. The solutions which have been found to improve the bonding of lacquer systems on the basis of organic solvents often are not satisfactory to improve the bonding of aqueous lacquer systems.

One of the possibilities to improve the bonding of lacquer systems consists in that compounds are processed in the polymer mixture which contribute to an improvement of the lacquer bonding.

The invention is based on the discovery that certain groups of compounds are suitable to improve the bonding of aqueous lacquer systems to articles formed from polyalkylene phthalate ester blended with other polymers. These compounds are preferably incorporated in the polymer mixture.

The invention therefore relates to certain polymer mixtures and articles molded therefrom, by injection molding or extrusion.

The particular aspect of the polymer mixture according to the invention is that it comprises a polyalkylene glycol polymer or polyalkylene glycol copolymer as an agent to improve the lacquer bonding.

The polymer mixture according to the invention preferably comprises:
35–70% by weight of component A;
15–50% by weight of component B;
5–25% by weight of component C and 0.1–10% by weight of component D.
with respect to the total quantity of components A,B, C and D.

U.S. Pat. No. 3,948,831 and Chemical Abstracts, vol. 73, no. 18 of Nov. 2, 1970, page 63, abstract 89085j, describe the treatment of polyester with polyalkylene glycols to improve the dyeability of fibers formed from such polyesters. Applying an aqueous lacquer onto the surface of an article molded out of the polymer is a quite difference process from dying fibres made out of a polyester.

EP-A-0386 256 corresponding with WO 90/01520 describes fibres made out of polyester or out of copolyether esters which have been treated with a very special type of polyoxyethylene polyethers to render them moisture absorbent and give them a good color fastness.

U.S. Pat. No. 4,540,749 describes the addition of polyethylene glycols to low melting blends of polyesters to decrease the minimum bonding temperature and to decrease the melt viscosity.

NL-A-68 13042, corresponding with GB-A-1,217,423, describes the addition of aliphatic polyethers to polyesters, to improve the impact strength thereof. The added polyethers have a high molecular weight of 5,000 to 1,000,000, preferably of 10,000 to 100,000.

EP-A-0,248,352 describes compositions of a polyester, an elastomer and a block copolyester. Nothing is said about adding additives enhance the bonding strength to lacquer systems.

U.S. Pat. No. 4,622,263 describes block-copolyether esters which may be blended with a polyalkylene glycol. The described block-copolyether esters as well as described blends have a high water absorbance.

The polymer mixture according to the invention comprises at any rate one or more of the following constituents:
A. a polyalkylene phthalate ester and
B. a copolyether ester
C. an agent to improve the impact strength
D. a polyalkylene glycol polymer or copolymer.

A. Polyalkylene phthalate

Polyalkylene phthalate esters are esters derived from one or more alkanediol compounds and one or more aromatic dicarboxylic acids.

A part of the aromatic dicarboxylic acids may be replaced by an aliphatic dicarboxylic acid. It is also possible to replace a part of the diol compounds by a polyol compound and/or a part of the dicarboxylic acid compound by a polycarboxylic acid.

The best suitable polyalkylene phthalate esters are the esters the diol component of which is derived for 80 mol % or more from butane-1,4-diol and the dicarboxylic acid component of which is derived for 80 mol % or more from terephthalic acid. The polyalkylene phtalate ester preferably has a melting point above 200° C.

B. Copolyether ester

Copolyether ester polymers are to be understood to mean herein block copolymers having a hard ester block and a soft elastomeric ether block. Examples of such block copolymers are described, for example, in U.S. Pat. No. 4,778,855.

C. Agent to improve the impact strength

As agents to improve the impact strength are to be considered in principle any agents which are suitable to improve the impact strength of polyalkylene phthalate esters. By way of example may be mentioned the graft copolymers which can be obtained by grafting one or more monomers, for example, styrene, acrylonitrile, an acrylic or methacrylic ester, methacrylic acid, maleic acid on a rubberlike latex, for example, a butadiene latex, a styrene butadiene latex, an acrylate latex.

D. Polyalkylene glycol polymer or polyalkylene glycol copolymer.

Polyalkylene glycol polymer or copolymers are compounds known per se. Their preparation and various applications of these polymers are described, for example, in Kirk-Othmer, Encyclopedia of Chemical Technology, 3rd edition, volume 18, pp. 616–645.

These polymers may be obtained by polymerisation of one or more different alkene oxides, for example, ethylene oxide and/or propylene oxide and/or butylene oxide. The molecular weight may be chosen between 200 and 10,000. Block copolymers with propylene oxide blocks and ethylene oxide blocks are preferably used. The alkylene units in component D preferably comprise not more than four carbon atoms. The polymer mixture according to the invention may moreover comprise conventionally used additives, for example, stabilisers, agents to improve the flame-retardant properties, fillers, release agents, pigments and dyes, reinforcing fibres, and the like.

The polymer mixture according to the invention can be obtained according to any conventionally used method of preparing polymer mixtures. The individual components are preferably mixed together in the melt in an extruder (compounded). The extrudate (in strand form) which emanates from the extruder is then chopped up to pellets. The pellets may be further processed, for example, in an injection moulding machine.

Examples I to V; comparative example A

Various polymer mixtures were prepared starting from the following constituents:

PBT: a polybutylene terephthalate ester having an intrinsic viscosity of 0.775 dl/gram measured in a 60/40 mixture of phenol and tetrachloro ethane at 25° C.

copoly—a polyether ester of the type as described in ether U.S. Pat. No. 4,778,855, derived from dimethyl ester: terephthalate, poly (tetramethylene oxide) diol and a mixture of butane diol and hexane diol.

ABS: A graft copolymer comprising approximately 70% by weight of polybutadiene rubber on which styrene and acrylonitrile have been grafted.

peg: polyethylene glycol having a molecular weight of approximately 3350.

pepg-1: a poly [propylene oxid-ethylene oxid] block copolymer having approximately 30% of polyethylene oxide; molecular weight polypropylene oxide block: approximately 1100; molecular weight of block copolymer approximately 1700.

pepg-2: a poly [propylene oxid-ethylene oxid] block copolymer having approximately 50% of polyethylene oxide; molecular weight polypropylene oxide block: approximately 3250; molecular weight of block copolymer approximately 6500.

ST: a mixture of conventionally used stabilisers.

The various constituents were compounded in a Werner and Pfleiderer extruder in the quantities as indicated in the table hereinafter. The resulting extrudate was chopped up. Test plates to determine the lacquer bonding (dimension: 175×175 mm, thickness 3 mm) were injection moulded from the pellets.

The surface of the plates was painted by means of a spray gun. The lacquer used was a commercially available aqueous primer (succeeded by drying at 80° C. for 15 minutes). A top layer was provided on the primer. The painted plates were cured at 80° C. for 45 minutes and then conditioned at 50° C. for 48 hours. The bonding strength was then determined according to ISO 6270 (after storing in a moist atmosphere for 96 hours). In the test, TESA TAPE 4651 was manually pressed on the painted surface. The TESA TAPE was then pulled off the surface. The surface was evaluated visually. Evaluation "Gto" indicates a good bonding; evaluation "Gt5" indicates a poor bonding.

A further test to determine the lacquer bonding was carried out as follows: a polycarbonate strip having a width of 17 mm (effective bonding width 15 mm) was adhered to the painted plates by means of a cyanoacrylate glue. The force required to pull off the polycarbonate strip in a direction vertical to the lacquered surface (with the lacquer layer adhered thereto) was measured in a tensile testing machine. The result is indicated as bonding strength (N/15 mm).

The results obtained are also recorded in the table hereinafter.

It may be seen from the results obtained that the lacquer bonding is considerably improved by the addition of polyalkylene glycol.

TABLE

| Example | A | I | II | III | B | IV |
|---|---|---|---|---|---|---|
| Composition (parts by weight) | | | | | | |
| o PBT | 99.2 | 97.2 | 98.2 | 98.2 | 49.2 | 47.2 |
| o Copolyether ester | — | — | — | — | 35 | 35 |
| o ABS | — | — | — | — | 15 | 15 |
| o peg | — | 2 | — | — | — | 2 |
| o pepg-1 | — | — | 1 | — | — | — |
| o pepg-2 | — | — | — | 1 | — | — |
| o ST | 0.8 | 0.8 | 0.8 | 0.8 | 0.8 | 0.8 |
| Results: | | | | | | |
| . lacquer bonding acc.to ISO 2409 | 2 × GTo + 3 × GT5 | 5 × GT5 | 5 × GTo | 5 × GTo | 5 × GTo | 5 × GTo |
| . lacquer acc.to ISO 6270 | 1 × GT2 + 1 × GT5 | 2 × GTo | 2 × GTo | 2 × GTo | 2 × GTo | 3 × GTo |
| . bonding strength Newton per 15 mm | | <not determined → | | | 17 | 39 |

We claim:

1. A polymer mixture comprising A) a polyalkylene phthalate ester, B) a copolyether ester block copolymer, C) a polymeric agent to improve impact strength and D) an agent to improve the bonding of aqueous lacquer systems upon the surface of articles moulded out of the polymer mixture, wherein, the polymer mixture comprises as an agent to improve said bonding a polyalkylene glycol polymer or a polyalkylene glycol copolymer.

2. A polymer mixture according to claim 1, wherein, the polymer mixture comprises:

35–70% by weight of component A;

15–50% by weight of component B;

5–25% by weight of component C and 0.1–10% by weight of component D.

with respect to the total quantity of components A,B, C and D.

3. A polymer mixture according to claim 1, wherein, the alkylene units of component D comprise not more than four carbon atoms.

4. A polymer mixture according to claim 1, wherein, component C is a graft copolymer obtained by grafting one or more monomers on a rubber-like latex.

5. Articles molded out of the polymer mixture according to claim 1.

* * * * *